United States Patent
Mizobata et al.

(10) Patent No.: US 10,220,743 B2
(45) Date of Patent: Mar. 5, 2019

(54) BACK FRAME STRUCTURE OF VEHICLE SEAT

(71) Applicant: TOYOTA BOSHOKU KABUSHIKI KAISHA, Aichi-ken (JP)

(72) Inventors: Hiroshi Mizobata, Aichi-ken (JP); Hiroyuki Suzuki, Aichi-ken (JP); Hirofumi Watanabe, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/602,555

(22) Filed: May 23, 2017

(65) Prior Publication Data
US 2017/0341554 A1    Nov. 30, 2017

(30) Foreign Application Priority Data
May 25, 2016   (JP) .................................. 2016-104016

(51) Int. Cl.
*B60N 2/68* (2006.01)
*B60N 2/80* (2018.01)
B60R 22/26 (2006.01)
B60R 22/18 (2006.01)

(52) U.S. Cl.
CPC ............... *B60N 2/68* (2013.01); *B60N 2/688* (2013.01); *B60N 2/80* (2018.02); *B60R 22/26* (2013.01); *B60R 2022/1818* (2013.01)

(58) Field of Classification Search
CPC .. B60N 2/68; B60N 2/80; B60N 2/688; B60R 22/26; B60R 2022/1818

USPC .................................................... 297/452.18
See application file for complete search history.

(56) References Cited

U.S. PATENT DOCUMENTS

| 7,066,552 | B2 * | 6/2006 | Yoshida | B60N 2/64 297/452.18 |
| 7,581,792 | B2 * | 9/2009 | Saberan | B60N 2/888 297/452.18 |
| 2005/0179299 | A1 * | 8/2005 | Yetukuri | B60N 2/80 297/391 |
| 2006/0273649 | A1 * | 12/2006 | Saberan | B60N 2/888 297/452.18 |
| 2012/0223563 | A1 * | 9/2012 | Zimmermann | B60N 2/682 297/391 |
| 2014/0375099 | A1 * | 12/2014 | Kitou | B60N 2/682 297/391 |
| 2015/0336528 | A1 * | 11/2015 | Tanabe | B60R 21/207 280/728.2 |
| 2016/0001689 | A1 * | 1/2016 | Yasuda | B60N 2/80 297/391 |

(Continued)

FOREIGN PATENT DOCUMENTS

JP    2015-101285    6/2015

*Primary Examiner* — Mark R Wendell
(74) *Attorney, Agent, or Firm* — Greenblum & Bernstein, P.L.C.

(57) ABSTRACT

A back frame structure of a vehicle seat, the back frame structure including: a pair of side frames extending in an upper and lower direction; and an upper frame that connects upper end sides of the side frames in a bridging manner, the upper frame including: a main body part having a substantially inverted U-shaped cross-section opened downward; and a cover member attached to the main body part so as to close at least a part of an opening end side in the cross-section of the main body part.

12 Claims, 6 Drawing Sheets

(56) References Cited

U.S. PATENT DOCUMENTS

| | | | |
|---|---|---|---|
| 2016/0009207 A1* | 1/2016 | Kuroda | B60N 2/80 297/180.14 |
| 2016/0229322 A1* | 8/2016 | Line | B60N 2/682 |
| 2016/0250950 A1* | 9/2016 | Omori | B60N 2/427 29/897.2 |
| 2016/0257276 A1* | 9/2016 | Line | B60N 2/68 |
| 2016/0339817 A1* | 11/2016 | Mizobata | B60N 2/80 |
| 2017/0368971 A1* | 12/2017 | Matsushima | B60N 2/20 |

* cited by examiner

BACK FRAME STRUCTURE OF VEHICLE SEAT

CROSS-REFERENCE TO RELATED APPLICATIONS

This application claims priority from Japanese Patent Application No. 2016-104016 filed on May 25, 2016, the entire contents of which are incorporated herein by reference.

TECHNICAL FIELD

The disclosure relates to a back frame structure of a vehicle seat to be mounted on a vehicle such as an automobile, an airplane, a ship, or a train.

BACKGROUND

As one of a back frame structure of a vehicle seat, JP-A-2015-101285 discloses a structure in which an upper frame is connected in a bridging manner between upper end portions of side frames when forming a frame-shaped back frame serving as a framework of a seat back. The back frame is used for a three-point seat belt built-in type vehicle seat. In the back frame structure disclosed in JP-A-2015-101285, the upper frame is formed in a closed section with a substantially rectangular cross-section in order to counteract the load applied from the seat belt, and a holder for holding a headrest support is arranged in a through-hole drilled in an upper and lower direction. That is, the entire of the upper frame is formed in a closed section, thereby securing torsional rigidity.

In the above-described structure, the upper frame is a member that is formed by extrusion molding or the like of a light alloy and is entirely formed in a closed section. Accordingly, there is a problem that some of surface portions cannot be omitted even if they are not necessary for securing a predetermined torsional rigidity, and thus, it is difficult to achieve weight reduction. Therefore, it is conceivable that weight-reducing holes are drilled in the upper frame that is entirely formed in the closed section. However, this method is liable to lead to an increase in cost due to an increase in processing steps.

SUMMARY

An object of the disclosure is to provide a back frame structure of a vehicle seat which has an upper frame with a closed section portion and which is capable of suppressing an increase in weight while securing torsional rigidity.

According to an aspect of the disclosure, there is provided a back frame structure of a vehicle seat, the back frame structure including: a pair of side frames extending in an upper and lower direction; and an upper frame that connects upper end sides of the side frames in a bridging manner, the upper frame including: a main body part having a substantially inverted U-shaped cross-section opened downward; and a cover member attached to the main body part so as to close at least a part of an opening end side in the cross-section of the main body part.

Accordingly, the upper frame is formed such that the cover member is attached to the main body part so as to close at least a part of the opening end side in the cross-section of the main body part having a substantially inverted U-shaped cross-section opened downward. In this way, since the upper frame is configured such that the cover member is attached only to the portions necessary for securing a predetermined torsional rigidity, it is possible to achieve weight reduction, as compared with the case where the upper frame is entirely formed in a closed section. That is, it is possible to suppress an increase in weight of the back frame while securing torsional rigidity of the upper frame.

DETAILED DESCRIPTION

FIGS. 1 to 7 show an embodiment of the disclosure. The present embodiment is an example where the disclosure is applied to a back frame of an automobile seat (hereinafter, simply referred to as a "back frame"). In each of the figures, respective directions of an automobile and an automobile seat when the automobile seat to which a back frame is attached is mounted on a floor of the automobile are indicated by arrows. In the following, the description relating to directions is made with reference to these directions.

Figure 1:
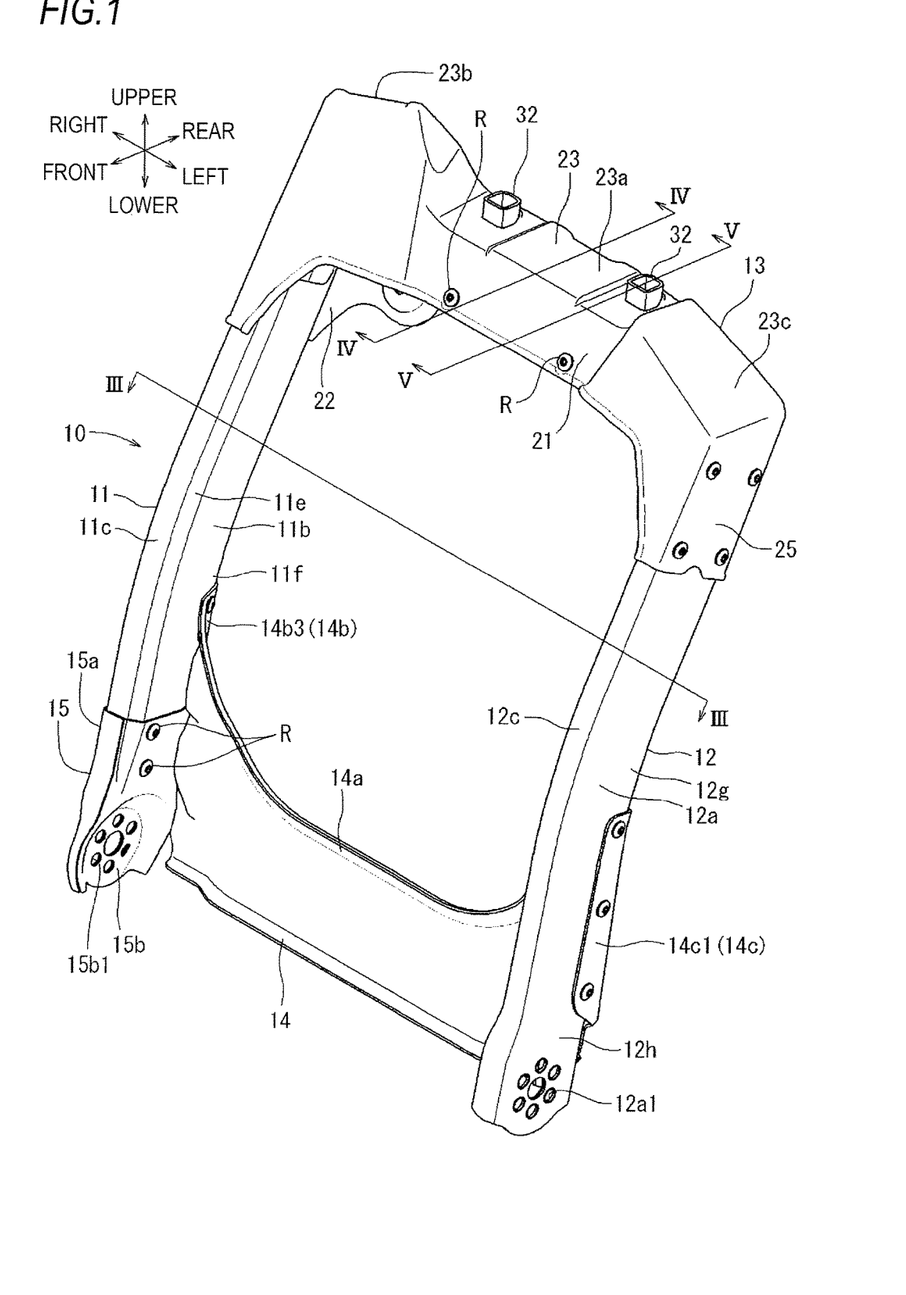
FIG. 1 is a perspective view of a back frame according to an embodiment of the disclosure.
Figure 2:
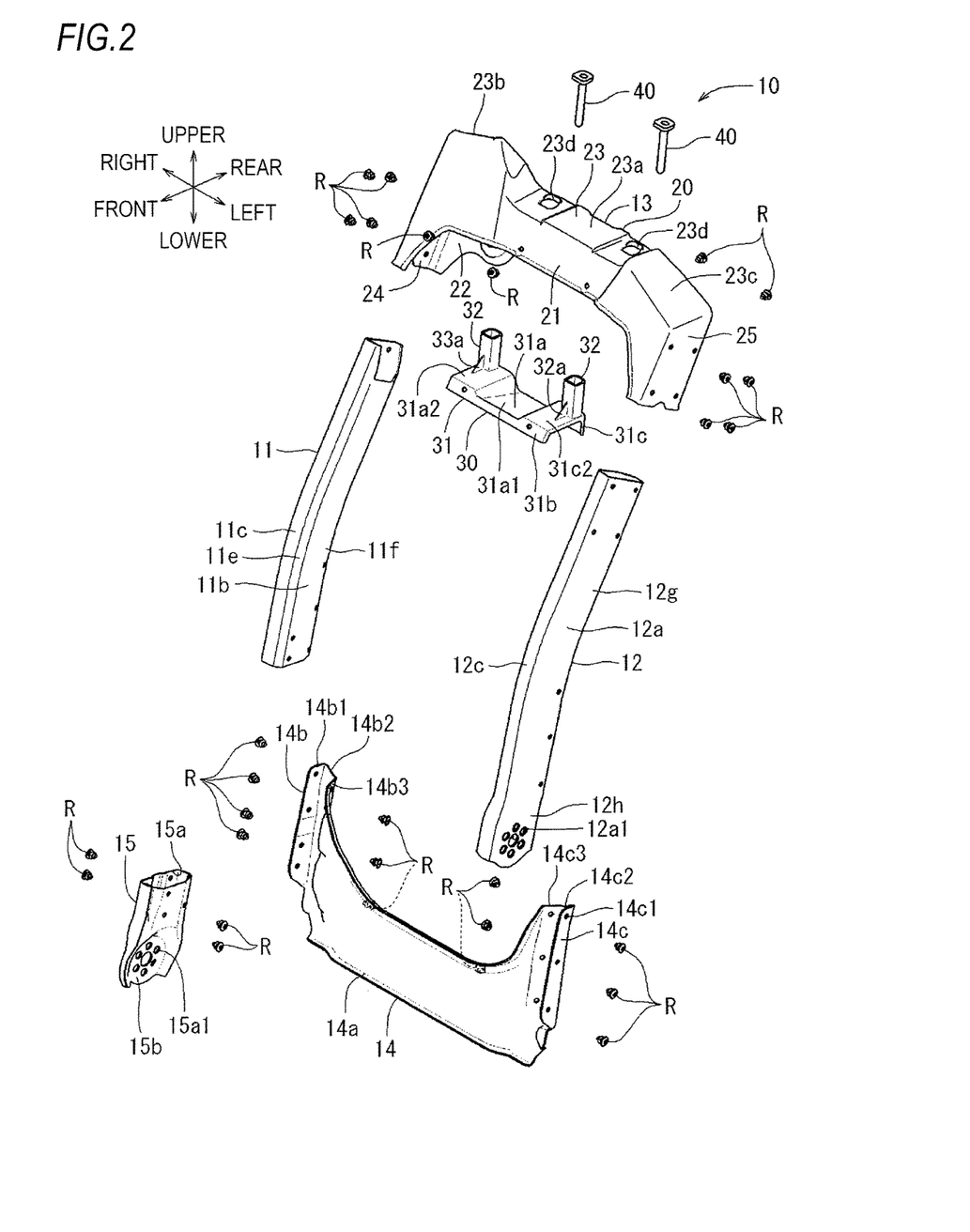
FIG. 2 is an exploded perspective view of the back frame of the above embodiment.

As shown in FIGS. 1 and 2, a back frame 10 of the present embodiment is a back frame of an automobile seat in which a seat belt is incorporated. A webbing take-up device (not shown) of a seat belt device can be attached to the back frame 10. The back frame 10 includes a right side frame 11 extending in an upper and lower direction, a left side frame 12 extending in the upper and lower direction, an upper frame 13 connecting upper end portions of the right side frame 11 and the left side frame 12, and a lower frame 14 connecting lower end portions thereof. Here, the right side frame 11 and the left side frame 12 correspond to the "side frames" in the claims.

Figure 3:
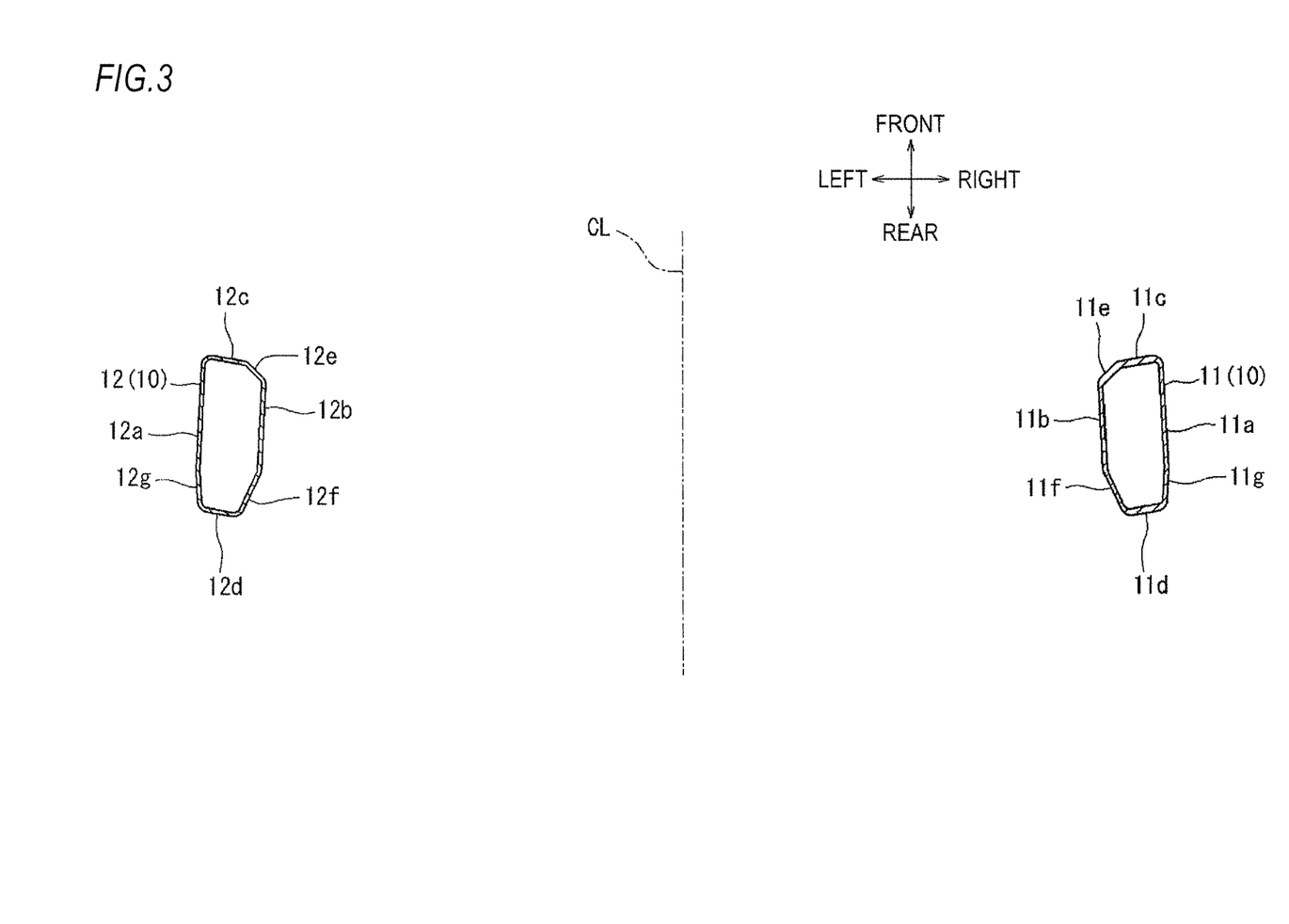
FIG. 3 is a sectional view taken along an arrow III-III in FIG. 1.
Figure 4:
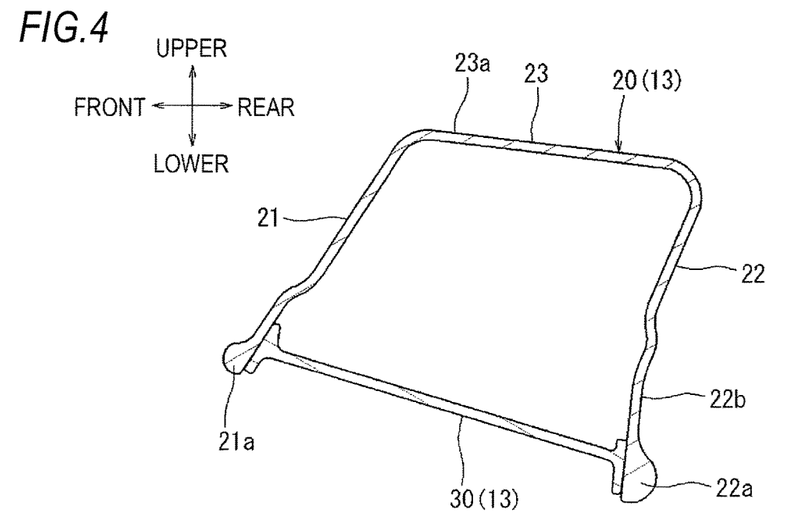
FIG. 4 is a sectional view taken along an arrow IV-IV in FIG. 1.
Figure 5:
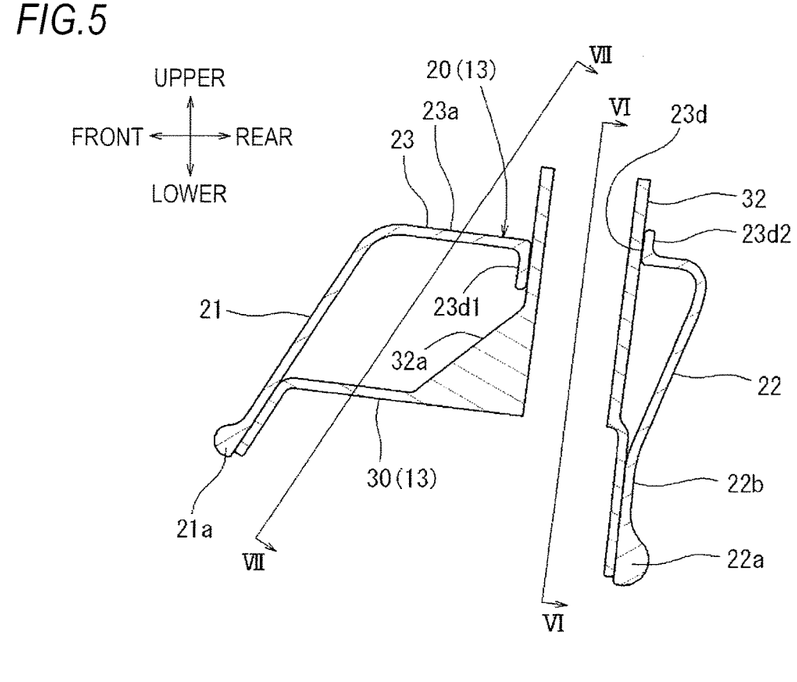
FIG. 5 is a sectional view taken along an arrow V-V in FIG. 1.
Figure 6:
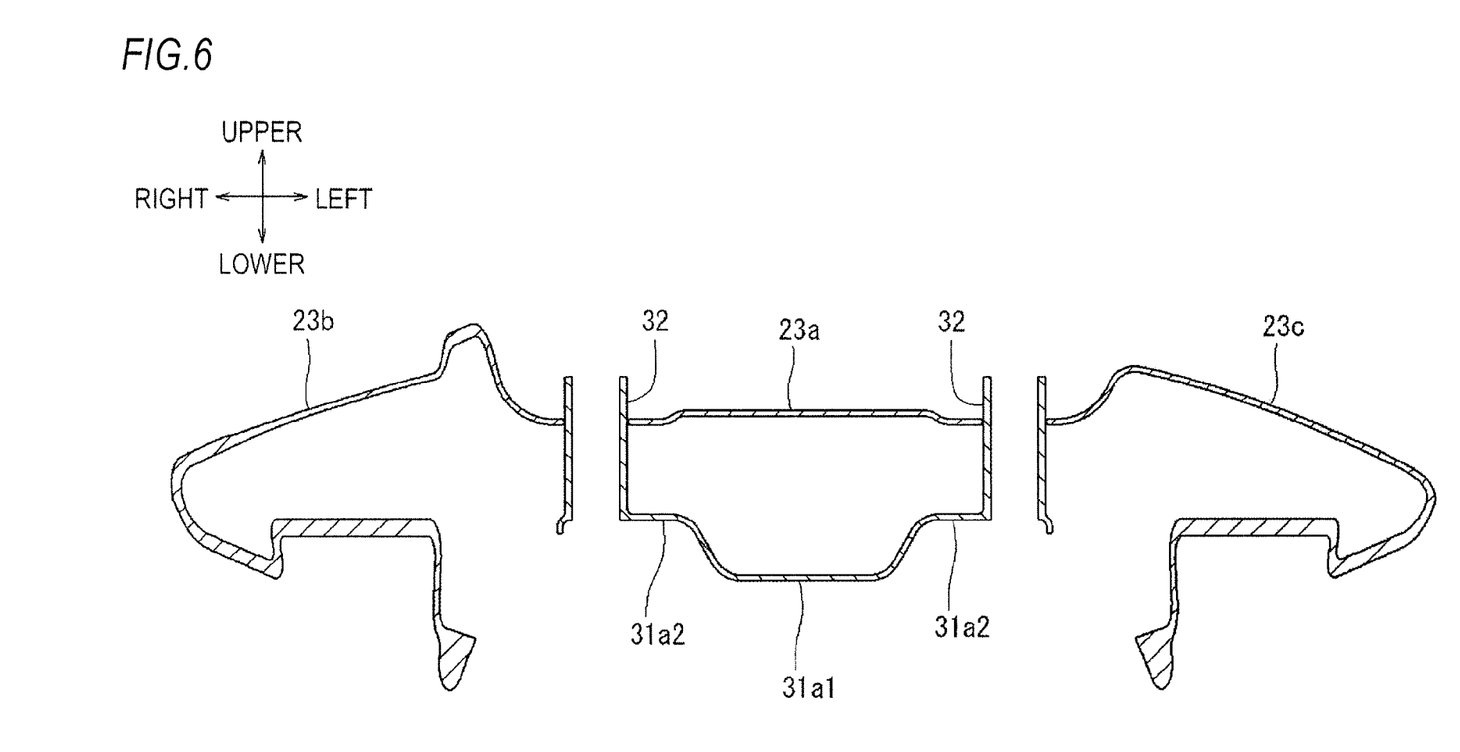
FIG. 6 is a sectional view taken along an arrow VI-VI in FIG. 5.
Figure 7:
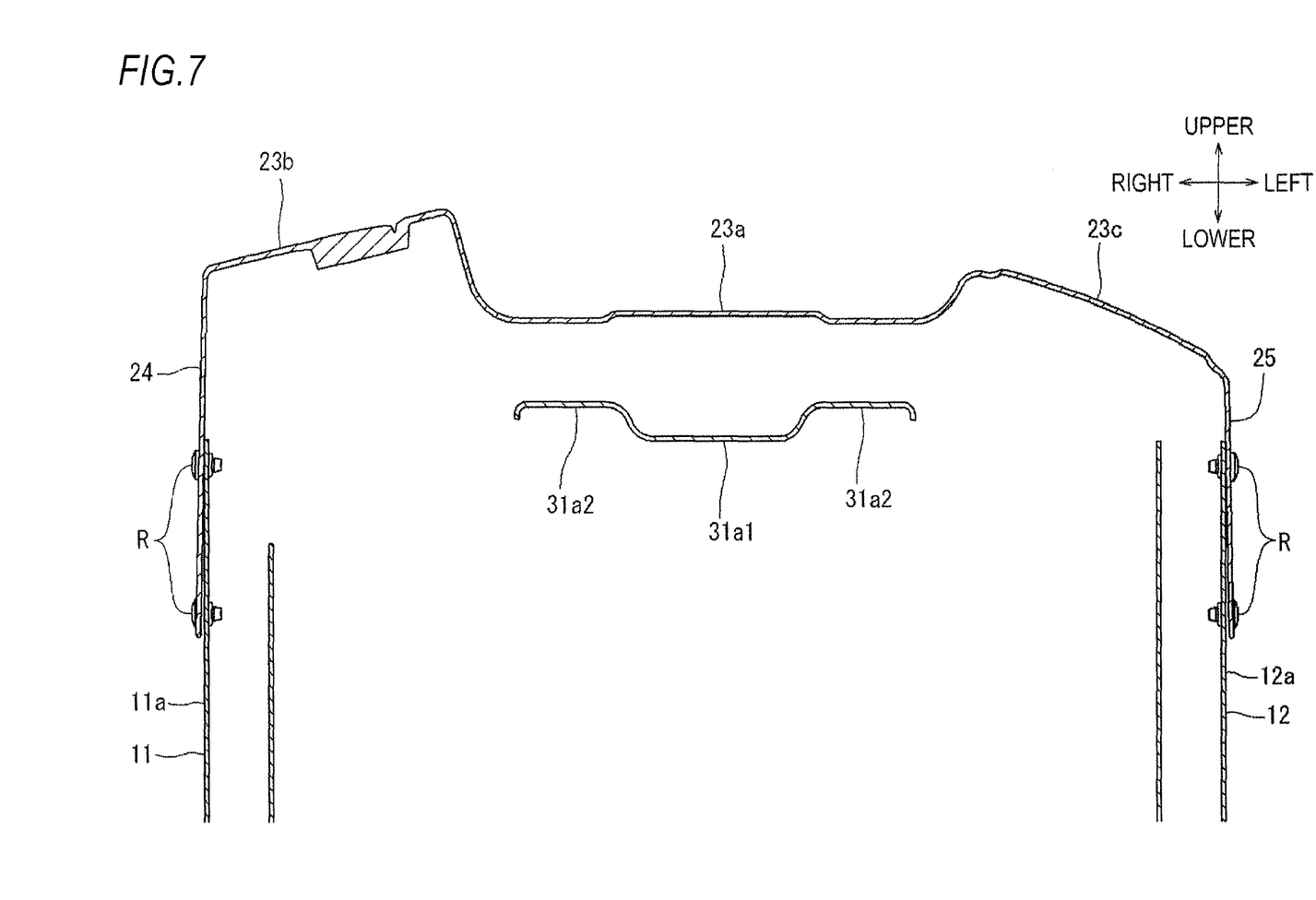
FIG. 7 is a sectional view taken along an arrow VII-VII in FIG. 5.

The right side frame 11 is made of an extruded material of an aluminum alloy having a sectional shape shown in FIG. 3, as a base. In FIG. 3, a cross-section of the right side frame 11 has a deformed heptagonal shape. The right side frame 11 has a right surface portion 11a, a left surface portion 11b, a front surface portion 11c, a rear surface portion 11d, a front left chamfered portion 11e, a rear left chamfered portion 11f, and a rear right chamfered portion 11g. The right surface portion 11a and the left surface portion 11b extend in parallel with each other while being inclined slightly toward the left (seat inside direction) with respect to a seat front and rear direction. The front surface portion 11c and the rear surface portion 11d extend in parallel with each other while being inclined slightly toward the rear with respect to a seat left and right direction. The front left chamfered portion 11e is a portion extending so as to connect a left end portion of the front surface portion 11c and a front end portion of the left surface portion 11b and has an inclination angle of about 45 degrees with respect to the left surface portion 11b. The rear left chamfered portion 11f is a portion extending so as to connect a left end portion of the rear surface portion 11*d* and a rear end portion of the left surface portion 11*b* and has an inclination angle of about 30 degrees with respect to the left surface portion 11*b*. The rear right chamfered portion 11*g* is a portion extending so as to connect a right end portion of the rear surface portion 11*d* and a rear end portion of the right surface portion 11*a* and has an inclination angle of about 5 degrees with respect to the right surface portion 11*a*.

The left side frame 12 is made of an extruded material of an aluminum alloy having a sectional shape shown in FIG. 3, as a base. In FIG. 3, a cross-section of the left side frame 12 has a deformed heptagonal shape. The left side frame 12 has a left surface portion 12*a*, a right surface portion 12*b*, a front surface portion 12*c*, a rear surface portion 12*d*, a front right chamfered portion 12*e*, a rear right chamfered portion 12*f*, and a rear left chamfered portion 12*g*. The left surface portion 12*a* and the right surface portion 12*b* extend in parallel with each other while being inclined slightly toward the right (seat inside direction) with respect to the seat front and rear direction. The front surface portion 12*c* and the rear surface portion 12*d* extend in parallel with each other while being inclined slightly toward the rear with respect to the seat left and right direction. The front right chamfered portion 12*e* is a portion extending so as to connect a right end portion of the front surface portion 12*c* and a front end portion of the right surface portion 12*b* and has an inclination angle of about 45 degrees with respect to the right surface portion 12*b*. The rear right chamfered portion 12*f* is a portion extending so as to connect a right end portion of the rear surface portion 12*d* and a rear end portion of the right surface portion 12*b* and has an inclination angle of about 30 degrees with respect to the right surface portion 12*b*. The rear left chamfered portion 12*g* is a portion extending so as to connect a left end portion of the rear surface portion 12*d* and a rear end portion of the left surface portion 12*a* and has an inclination angle of about 5 degrees with respect to the left surface portion 12*a*.

As shown in FIG. 3, an external line of the cross-sectional shape of the right side frame 11 and an external line of the cross-sectional shape of the left side frame 12 are in line symmetry with respect to a centerline CL of the back frame 10 in the left and right direction. Further, the thickness of the right surface portion 11*a* and the left surface portion 11*b* of the right side frame 11 is substantially equal to the thickness of the left surface portion 12*a* and the right surface portion 12*b* of the left side frame 12. On the other hand, the thickness of the front surface portion 11*c* and the rear surface portion 11*d* of the right side frame 11 is approximately twice the thickness of the front surface portion 12*c* and the rear surface portion 12*d* of the left side frame 12. The reason is that a belt guide portion 23*b* for guiding a seat belt is disposed on an upper side of the right side frame 11, and thus, a larger bending force in the front and rear direction is applied to the right side frame 11 than the left side frame 12, and thus, the geometrical moment of inertia of the right side frame 11 should be further increased in order to counteract the above situation. As shown in FIGS. 1 and 2, the right side frame 11 and the left side frame 12 are formed by making the extruded material having a constant section bent in a convex shape toward the front in the vicinity of the central portion in the upper and lower direction. Further, an upper arm 15 that is a press part made of iron is attached to the lower end side of the right side frame 11. The upper arm 15 is a part formed as one part by combining two parts in a hollow shape. An upper side portion of the upper arm 15 is formed as a side frame connection portion 15*a* so that an internal line of a horizontal section corresponds to an external line of the cross-sectional shape of the right side frame 11. Further, a lower side portion of the upper arm 15 is formed as a flat plate-like recliner connection portion 15*b* and has recliner connection holes 15*b*1 formed therein. The lower end side of the right side frame 11 is fastened and connected by four rivets R in a state of being inserted into the side frame connection portion 15*a* of the upper arm 15. A recliner connection portion 12*h* is formed on a lower end side of the left side frame 12. The recliner connection portion 12*h* is configured such that the front surface portion 12*c* is expanded toward the front and recliner connection holes 12*a*1 for attaching a recliner are provided in the left surface portion 12*a*.

As shown in FIGS. 1, 2 and 4 to 7, the upper frame 13 includes a main body part 20 having a substantially inverted U-shaped cross-section and opened downward, and a cover member 30 that is attached to a central portion on a lower opening side of the main body part 20 so as to cover the opening. The main body part 20 is a molded article of a fiber-reinforced composite resin, which is obtained by curing a plurality of laminated carbon fiber fabrics with a matrix resin of epoxy resin. The main body part 20 has a front wall portion 21, a rear wall portion 22, an upper wall portion 23, a right wall portion 24, and a left wall portion 25.

The upper wall portion 23 has a central portion 23*a* located at the center in the left and right direction, a belt guide portion 23*b* located on the right end side, and a pedestal portion 23*c* located on the left end side. The central portion 23*a* is a surface portion which is substantially horizontal in a standard state where the back frame 10 stands up against a rear portion of a cushion frame and which extends in a direction substantially perpendicular to holder portions 32 described later. At bilaterally symmetrical positions of the central portion 23*a* with respect to a center plane in the left and right direction, a pair of holder insertion holes 23*d* is provided to penetrate in the upper and lower direction. At the central portion 23*a* of a peripheral edge portion of each holder insertion hole 23*d*, a front standing wall portion 23*d*1 for mainly supporting the front surface portion side of each holder portion 32 is erected downwardly, and a rear standing wall portion 23*d*2 for mainly supporting the rear surface portion side of each holder portion 32 is erected upwardly. Specifically, the front standing wall portion 23*d*1 is disposed in a substantially inverted U-shape in a plan view and extends from a front side portion to both side portions of the peripheral edge portion of each holder insertion hole 23*d*. The rear standing wall portion 23*d*2 is disposed in a substantially inverted U-shape in a plan view and extends from a rear side portion to both side portions of the peripheral edge portion of each holder insertion hole 23*d*. The belt guide portion 23*b* is a mountain-shape portion which is raised upwardly and has a ridge line inclined downward to the right in the left and right direction. The belt guide portion 23*b* functions to guide a webbing (not shown) of a seat belt device released from a webbing take-up device (not shown) disposed inside a seat back from a back surface of the back frame 10 to a front surface of an upper body of a seated occupant. The pedestal portion 23*c* is a trapezoidal portion protruding slightly upward with respect to the central portion 23*a* and is intended to form the shape of a shoulder portion of the seat back. Here, the holder insertion holes 23*d* correspond to the "through-hole" in the claims. Further, the front standing wall portion 23*d*1 and the rear standing wall portion 23*d*2 correspond to the "standing wall portion" in the claims.

The front wall portion 21 extends forward and downward while forming an obtuse angle relative to the central portion 23a of the upper wall portion 23. Further, the front wall portion 21 extends substantially parallel to the front surface portion 11c and the front surface portion 12c on the upper sides of the right side frame 11 and the left side frame 12 when the upper frame 13 is connected to the right side frame 11 and the left side frame 12. A thick portion 21a for increasing the rigidity of an end portion is provided at a lower end portion of the front wall portion 21. The rear wall portion 22 extends substantially parallel to the rear surface portion 11d and the rear surface portion 12d on the upper sides of the right side frame 11 and the left side frame 12 when the upper frame 13 is connected to the right side frame 11 and the left side frame 12. That is, the front wall portion 21 and the rear wall portion 22 extend forward and downward substantially in parallel with each other. A connection surface portion 22b is formed at the portion of the rear wall portion 22 corresponding to the central portion 23a of the upper wall portion 23. A lower side portion of the connection surface portion 22b extends downward substantially perpendicular to the upper wall portion 23, and a rear wall surface portion 31c of the cover member 30 described later is connected to the connection surface portion 22b. A thick portion 22a for increasing the rigidity of an end portion is provided at a lower end portion of the rear wall portion 22. Right end portions of the upper wall portion 23, the front wall portion 21 and the rear wall portion 22 are connected by the right wall portion 24, and left end portions of the upper wall portion 23, the front wall portion 21 and the rear wall portion 22 are connected by the left wall portion 25, thereby forming the substantially box-shaped main body part 20 opened downward.

As shown in FIGS. 2 and 4 to 7, the cover member 30 is a die-cast molded article of aluminum. The cover member 30 includes a base portion 31 having a substantially rectangular shape in a plan view, and a pair of rectangular tubular holder portions 32 standing on the rear sides of the left and right end portions of the base portion 31. The base portion 31 has an upper wall surface portion 31a, a front wall surface portion 31b, and a rear wall surface portion 31c. A concave surface portion 31a1 is provided at the central portion in the left and right direction of the upper wall surface portion 31a. Convex portions 31a2 each raised in a trapezoidal shape are provided on both left and right sides of the concave surface portion 31a1. A holder portion 32 is respectively provided on the rear side of each convex surface portion 31a2. An inner tubular portion of each holder portion 32 penetrates in the upper and lower direction so that a headrest support 40 can be inserted thereinto. A bracing wall 32a for stably holding each holder portion 32 with respect to each convex portion 31a2 is provided between the front surface portion of each holder portion 32 and each convex portion 31a2. Here, the holder portions 32 correspond to the "holder" in the claims.

As shown in FIGS. 2 and 4 to 7, the cover member 30 is assembled to the main body part 20 in a state where the upper end sides of the pair of holder portions 32 are respectively inserted into a pair of holder insertion holes 23d of the main body part 20 from below. Specifically, in a state where each holder portion 32 is exposed from an upper surface of the central portion 23a by about one third of its upper and lower direction length from its upper end, a lower end side of the front wall portion 21 of the main body part 20 is abutted against the front wall surface portion 31b of the cover member 30 and fastened and fixed thereto by two rivets R. Further, in the same state, the connection surface portion 22b of the rear wall portion 22 of the main body part 20 is abutted against the rear wall surface portion 31c of the cover member 30 and fastened and fixed thereto by two rivets R. In this way, the cover member 30 is fixed to the front wall portion 21 and the rear wall portion 22 corresponding to the central portion 23a of the upper wall portion 23 of the main body part 20, thereby forming a closed section structure. At this time, the pair of holder portions 32 of the cover member 30 is mainly supported from the front and rear by the front standing wall portion 23d1 and the rear standing wall portion 23d2 of the main body part 20, respectively.

As shown in FIGS. 1 and 2, the lower frame 14 has a substantially U shape in a front view. The lower frame 14 is a molded article of a fiber-reinforced composite resin, which is obtained by curing a plurality of laminated carbon fiber fabrics with a matrix resin of epoxy resin. The lower frame 14 includes a main body portion 14a, a right connection portion 14b, and a left connection portion 14c. The right connection portion 14b is disposed on the right side of the main body portion 14a and is a connection portion to be connected to the lower end side of the right side frame 11 and the upper arm 15. The left connection portion 14c is a connection portion to be connected to the lower end side of the left side frame 12. Ribs (not shown) are provided in the main body portion 14a, thereby increasing rigidity. The right connection portion 14b is formed in a substantially U shape in which a cross-section cut along a horizontal plane opens forward. The right connection portion 14b has a right surface portion 14b1, a rear surface portion 14b2, and a left surface portion 14b3 which correspond to the rear right chamfered portion 11g, the rear surface portion 11d, and the rear left chamfered portion 11f of the right side frame 11, respectively. The left connection portion 14c is formed in a substantially U shape in which the cross-section cut along the horizontal plane opens forward. The left connection portion 14c has a left surface portion 14c1; a rear surface portion 14c2, and a right surface portion 14c3 which correspond to the rear left chamfered portion 12g, the rear surface portion 12d, and the rear right chamfered portion 12f of the left side frame 12, respectively.

As shown in FIGS. 1 to 3 and 7, the upper frame 13 is put on the upper end portions of the right side frame 11 and the left side frame 12 from above. In this state, the right wall portion 24 and the left wall portion 25 of the upper frame 13 are respectively abutted against the right surface portion 11a and the rear right chamfered portion 11g of the right side frame 11 and the left surface portion 12a and the rear left chamfered portion 12g of the left side frame 12 and are fastened and fixed thereto by four rivets R. Next, in a state where the upper arm 15 is attached to the lower end side of the right side frame 11, the right connection portion 14b of the lower frame 14 is put thereon from behind. Then, the rear right chamfered portion 11g of the right side frame 11 and the right surface portion 14b1 of the lower frame 14 are abutted against each other and fastened and fixed by four rivets R. Further, in the same state, the rear left chamfered portion 11f of the right side frame 11 and the left surface portion 14b3 of the lower frame 14 are abutted against each other and fastened and fixed by three rivets R. Next, the left connection portion 14c of the lower frame 14 is put on the lower end side of the left side frame 12 from behind. Then, the rear left chamfered portion 12g of the left side frame 12 and the left surface portion 14c1 of the lower frame 14 are abutted against each other and fastened and fixed by three rivets R. Further, in the same state, the rear right chamfered portion 12f of the left side frame 12 and the right surface portion 14c3 of the lower frame 14 are abutted against each other and fastened and fixed by three rivets R. In this way, the left side frame 12, the right side frame 11, the upper frame 13, and the lower frame 14 are connected to form the substantially rectangular back frame 10, as seen in a front view. Meanwhile, the back frame 10 is configured such that the recliner connection portion 15b of the upper arm 15 and the recliner connection portion 12h of the left side frame 12 are attached to the rear end side of a seat cushion frame (not shown) via recliners (not shown), respectively.

The present embodiment configured as described above has the following operational effects. The upper frame 13 is formed such that the cover member 30 is attached to the portion of the main body part 20 which corresponds to the central portion 23a of the upper wall portion 23, which is a part of the opening end side of the main body part 20 having a substantially inverted U-shaped cross-section opened downward. In this way, since the upper frame 13 is configured such that the cover member 30 is attached only to the portions necessary for securing a predetermined torsional rigidity, it is possible to achieve weight reduction, as compared with the case where the cover member is attached over the entire portion in the left and right direction to form a closed section. That is, it is possible to suppress an increase in weight of the back frame 10 while securing torsional rigidity of the upper frame 13. Further, the holder portions 32 for supporting the headrest supports 40 are formed integrally with the cover member 30, and the upper end sides of the holder portions 32 are inserted and supported in the holder insertion holes 23d of the main body part 20. In this way, the cover member 30 not only contributes to securing the torsional rigidity of the upper frame 13 but also contributes to securing the support strength of the headrest supports 40 through securing the support strength of the holder portions 32. Further, since the holder portions 32 are formed integrally with the cover member 30, the assembling workability is better, as compared with the case where the holder portions are separately attached to the upper frame 13. Further, since the front standing wall portion 23d1 and the rear standing wall portion 23d2 are provided in the peripheral edge portion of each holder insertion hole 23d of the main body part 20, it is possible to further increase the support strength of each holder portion 32. In addition, since the main body part 20 of the upper frame 13 is made of a carbon fiber-reinforced composite resin, and the cover member 30 is made of aluminum, it is possible to further achieve the weight reduction.

Although specific embodiments have been described above, the disclosure is not limited to these appearances and configurations, and various modifications, additions and deletions can be made without changing the spirit of the disclosure. For example, the following can be exemplified.

1. In the above embodiment, the cover member 30 is attached to the portion of the upper frame 13 corresponding to the central portion 23a of the upper wall portion 23 of the main body part 20. However, the disclosure is not limited thereto. For example, the length in the left and right direction of the cover member 30 may be longer or shorter than the central portion 23a in accordance with the magnitude of the torsional rigidity required for the upper frame 13. Further, the cover member 30 may be divided into a plurality of pieces.

2. In the above embodiment, the holder portions 32 are formed integrally with the cover member 30. However, the disclosure is not limited thereto. For example, the holder portions may be separately provided and may pass through through-holes provided in the main body part 20 and the cover member 30, thereby connecting the main body part 20 and the cover member 30. Further, tubular standing wall portions may be formed at peripheral edge portion of at least one of the through-holes provided in the main body part 20 and the cover member 30, thereby replacing the holder portions 32.

3. In the above embodiment, the main body part 20 is made of a fiber-reinforced composite resin, and the cover member 30 is made of aluminum. However, the disclosure is not limited thereto. For example, the main body part 20 may be made of a light alloy such as aluminum or magnesium, and the cover member 30 may be made of a fiber-reinforced composite resin such as carbon or glass. In addition, both the main body part 20 and the cover member 30 may be made of iron.

4. In the above embodiment, the disclosure is applied to an automobile seat. However, the disclosure may be applied to a seat to be mounted on a vehicle such as an airplane, a ship or a train.

The disclosure provides illustrative, non-limiting examples as follows:

According to a first aspect, there is provided a back frame structure of a vehicle seat, the back frame structure including: a pair of side frames extending in an upper and lower direction; and an upper frame that connects upper end sides of the side frames in a bridging manner, the upper frame including: a main body part having a substantially inverted U-shaped cross-section opened downward; and a cover member attached to the main body part so as to close at least a part of an opening end side in the cross-section of the main body part.

According to the first aspect, the upper frame is formed such that the cover member is attached to the main body part so as to close at least a part of the opening end side in the cross-section of the main body part having a substantially inverted U-shaped cross-section opened downward. In this way, since the upper frame is configured such that the cover member is attached only to the portions necessary for securing a predetermined torsional rigidity, it is possible to achieve weight reduction, as compared with the case where the upper frame is entirely formed in a closed section. That is, it is possible to suppress an increase in weight of the back frame while securing torsional rigidity of the upper frame.

According to a second aspect, there is provided the back frame structure of the vehicle seat according to the first aspect, wherein the cover member is arranged at an attachment portion at which a headrest support is attached to the upper frame, and a through-hole in which the headrest support is inserted and supported is formed to the main body part and the cover member at the attachment portion.

According to the second aspect, the cover member is arranged at the attachment portion of the headrest support. Therefore, the cover member not only contributes to securing the torsional rigidity of the upper frame but also contributes to securing the support strength of the headrest support.

According to a third aspect, there is provided the back frame structure of the vehicle seat according to the second aspect, wherein the headrest support is attached to a tubular holder fixed to a peripheral edge portion of the through-hole.

According to the third aspect, the headrest support is supported by the tubular holder over a predetermined length. Therefore, the support strength of the headrest support by the upper frame is increased.

According to a fourth aspect, there is provided the back frame structure of the vehicle seat according to the third aspect, wherein the holder is formed integrally with the cover member or the main body part.

According to the fourth aspect, it is only necessary to attach the cover member to the main body part when assembling the upper frame. Therefore, the assembling workability is better.

According to a fifth aspect, there is provided the back frame structure of the vehicle seat according to the third or fourth aspect, wherein a standing wall portion that extends in the upper and lower direction and supports the headrest support or the holder is provided at a peripheral edge portion of the through-hole of at least one of the main body part and the cover member.

According to the fifth aspect, it is possible to achieve weight reduction and to reduce the number of parts by using the standing wall portion as the holder without using the holder. Further, when the holder is used, it is possible to increase the support strength of the holder.

According to a sixth aspect, there is provided the back frame structure of the vehicle seat according to the second aspect, wherein a standing wall portion that extends in the upper and lower direction and supports the headrest support is provided at a peripheral edge portion of the through-hole of at least one of the main body part and the cover member.

According to the sixth aspect, it is possible to achieve weight reduction and to reduce the number of parts by using the standing wall portion without using a holder.

According to a seventh aspect, there is provided the back frame structure of the vehicle seat according to any one of the first to sixth aspects, wherein at least one of the main body part and the cover member is made of a fiber-reinforced composite resin or a light alloy.

According to the seventh aspect, at least one of the main body part and the cover member is made of a fiber-reinforced composite resin or a light alloy. Therefore, in addition to the operational effects of any one of the first to sixth aspects, it is possible to further achieve the weight reduction.

According to an eighth aspect, there is provided the back frame structure of the vehicle seat according to any one of the first to seventh aspects, wherein the main body part and the cover member are made of different materials.

What is claimed is:

1. A back frame structure of a vehicle seat, the back frame structure comprising:
    a pair of side frames extending in an upper and lower direction; and
    an upper frame that connects upper end sides of the side frames in a bridging manner, the upper frame including:
        a main body part having a pair of opposing wall portions and an upper wall portion that connects the pair of opposing wall portions so as to form a substantially inverted U-shaped recess opened downward;
        a cover member attached to a lower portion of the pair of opposing wall portions so as to close at least a portion of the U-shaped recess.

2. The back frame structure of the vehicle seat according to claim 1,
    wherein the cover member is arranged at an attachment portion at which a headrest support is attached to the upper frame, and a through-hole in which the headrest support is inserted and supported is formed to the main body part and the cover member at the attachment portion.

3. The back frame structure of the vehicle seat according to claim 2,
    wherein the headrest support is attached to a tubular holder fixed to a peripheral edge portion of the through-hole.

4. The back frame structure of the vehicle seat according to claim 3,
    wherein the holder is formed integrally with the cover member or the main body part.

5. The back frame structure of the vehicle seat according to claim 3,
    wherein a standing wall portion that extends in the upper and lower direction and supports the headrest support or the holder is provided at a peripheral edge portion of the through-hole of at least one of the main body part and the cover member.

6. The back frame structure of the vehicle seat according to claim 3, wherein, at an opening end side of the U-shaped recess, a pair of opposing side edges of the cover member abuts a pair of opposing side edges of the pair of opposing wall portions.

7. The back frame structure of the vehicle seat according to claim 6, wherein the cover member has an upper surface oriented generally perpendicular to a longitudinal axis of the tubular holder.

8. The back frame structure of the vehicle seat according to claim 3, wherein the cover member has an upper surface oriented generally perpendicular to a longitudinal axis of the tubular holder.

9. The back frame structure of the vehicle seat according to claim 2,
    wherein a standing wall portion that extends in the upper and lower direction and supports the headrest support is provided at a peripheral edge portion of the through-hole of at least one of the main body part and the cover member.

10. The back frame structure of the vehicle seat according to claim 1,
    wherein at least one of the main body part and the cover member is made of a fiber-reinforced composite resin or a light alloy.

11. The back frame structure of the vehicle seat according to claim 1,
    wherein the main body part and the cover member are made of different materials.

12. The back frame structure of the vehicle seat according to claim 1, wherein a cross-sectional thickness of a pair of opposing side edges of the pair of opposing wall portions is greater than a cross-sectional thickness of intermediate regions of the pair of opposing wall portions so as to define thick portions at an opening end side of the U-shaped recess.

* * * * *